US012697872B2

(12) United States Patent
Chen et al.

(10) Patent No.: US 12,697,872 B2
(45) Date of Patent: Aug. 4, 2026

(54) SMART SURFACE, CENTER CONSOLE FOR VEHICLE, AND VEHICLE

(71) Applicant: VARITRONIX (HEYUAN) DISPLAY TECHNOLOGY LTD., Heyuan City (CN)

(72) Inventors: Jinwu Chen, Heyuan City (CN); Huaiping Zhang, Heyuan City (CN); Haiqiang Zhong, Heyuan City (CN); Hongzhang Li, Heyuan City (CN); Zhongfu Cao, Heyuan City (CN); Dianyi Ruan, Heyuan City (CN); Junjie Fang, Heyuan City (CN); Zhijian Zhu, Heyuan City (CN)

(73) Assignee: VARITRONIX (HEYUAN) DISPLAY TECHNOLOGY LTD., Heyuan City (CN)

( * ) Notice: Subject to any disclaimer, the term of this patent is extended or adjusted under 35 U.S.C. 154(b) by 426 days.

(21) Appl. No.: 18/517,314

(22) Filed: Nov. 22, 2023

(65) Prior Publication Data

US 2024/0166048 A1 May 23, 2024

(30) Foreign Application Priority Data

Nov. 23, 2022 (CN) .......................... 202223124238.4

(51) Int. Cl.
| | |
|---|---|
| *B60K 35/22* | (2024.01) |
| *B44F 9/02* | (2006.01) |
| *B60K 35/40* | (2024.01) |

(52) U.S. Cl.
CPC ................ *B60K 35/22* (2024.01); *B44F 9/02* (2013.01); *B60K 35/415* (2024.01); *B60K 2360/339* (2024.01); *B60K 2360/693* (2024.01)

(58) Field of Classification Search
None
See application file for complete search history.

(56) References Cited

U.S. PATENT DOCUMENTS

| | | | | |
|---|---|---|---|---|
| 2020/0369223 A1* | 11/2020 | Hansen | ................. | B60K 35/10 |
| 2022/0113827 A1* | 4/2022 | Suzuki | .................... | B32B 27/08 |
| 2022/0176821 A1* | 6/2022 | Hart | ....................... | B60K 35/60 |

FOREIGN PATENT DOCUMENTS

| | | |
|---|---|---|
| CN | 109940905 A | 6/2019 |
| CN | 209972320 U | 1/2020 |
| CN | 113212019 A | 8/2021 |

OTHER PUBLICATIONS

Extended European Search Report for EP Application No. 23211507.1; Mailing Date, Jul. 10, 2024.

* cited by examiner

*Primary Examiner* — Phu Vu
(74) *Attorney, Agent, or Firm* — CANTOR COLBURN LLP

(57) ABSTRACT

Provided are a smart surface, a center console of a vehicle, and a vehicle. The smart surface includes a display device (10), a decorative cover plate (20) including a decorative pattern layer (21), a substrate layer (22), an optical adhesive layer (23), and a glass layer (24) stacked sequentially from top to bottom, an upper surface of the glass layer (24) being fitted to the optical adhesive layer (23), and a lower surface of the glass layer (24) being covered on the display device (10), and an AG fluorescent film (30) fitted to the decorative pattern layer (21), and the AG fluorescent film (30) is used for filtering ambient light or light emitted from the decorative pattern layer (21). The smart surface provided by the present application can reduce the obstruction of the image caused by the decorative pattern by providing the AG fluorescent film.

17 Claims, 2 Drawing Sheets

SMART SURFACE, CENTER CONSOLE FOR VEHICLE, AND VEHICLE

CROSS-REFERENCE TO RELATED APPLICATIONS

This application claims the benefit of Chinese patent application No. 202223124238.4 filed on Nov. 23, 2022, the contents of which are incorporated herein by reference.

TECHNICAL FIELD

The present application relates to the technical field of automotive interiors, and in particular, to a smart surface, a center console of a vehicle, and a vehicle.

BACKGROUND

With the concept of smart passenger compartments becoming popular, there has emerged an innovative technology of integrating sound, light and electricity on the interior surfaces, this has brought a form of interaction that is different from that of conventional buttons to the automotive industry, providing an improved experience in technology and aesthetics as well as a more comfortable and interesting driving experience to users. The technology that seamlessly integrates information display, intelligent control and lighting into a unified surface is collectively known as smart surface technology.

Smart surfaces may include a display device and a decorative cover plate covering the display of the display device. The decorative cover plate presents a decorative pattern when the display device is not in operation, at this point the smart surface acts as a conventional decorative part for static decoration; and the image on the display is presented on the decorative pattern when the display device is in operation, at this point the smart surface can realize human-computer interaction functions (e.g., in-vehicle information display, intelligent control, etc.). When the image is presented on the decorative pattern, the decorative pattern may overlap the image, resulting in an unclear image display, thus affecting the display effect of the smart surface.

SUMMARY

The present application provides a smart surface, a center console of a vehicle, and a vehicle, the smart surface is capable of reducing obstruction of an image by a pattern by providing an anti-glare (AG) fluorescent film, thereby making the image display clearer, and improving the display effect of the smart surface.

In a first aspect, an embodiment of the present application provides a smart surface including: a display device; a decorative cover plate including a decorative pattern layer, a substrate layer, an optical adhesive layer, and a glass layer stacked sequentially from top to bottom, an upper surface of the glass layer is fitted to the optical adhesive layer, and a lower surface of the glass layer is covered on the display device; an AG fluorescent film fitted to the decorative pattern layer, and the AG fluorescent film is used for filtering ambient light or light emitted from the decorative pattern layer.

The smart surface provided by the embodiment of the present application can reduce the obstruction of the image caused by the decorative pattern to a certain extent by providing the AG fluorescent film over the decorative cover plate, so that the image displayed by the display device can be more clearly presented on the decorative cover plate, and the display effect of the smart surface can be improved.

In a possible design, the smart surface further includes an embossed-texture layer fitted to the AG fluorescent film layer, the embossed-texture layer has an embossed pattern. The embossed-texture layer can enhance the realism of the smart surface.

In a possible design, a transparent protective film is adhered to the embossed-texture layer, the transparent protective film has a hardness greater than 3 H. The transparent protective film can protect the embossed-texture layer from wear and damage, so that the service life of the smart surface can be improved.

In a possible design, a decorative pattern on the decorative pattern layer is a wooden pattern. The appearance of the decorative pattern as wood grain can increase the aesthetics of the smart surface.

In a possible design, when the decorative pattern on the decorative pattern layer is the wooden pattern, the embossed pattern also imitates wood grain. The wood grain pattern allows the smart surface not only to visually have a three-dimensional, layered and varying textured effect as that of natural wood, but also demonstrate the tactility of the embossed wood grain, so as to increase the realistic feel of the smart surface.

In a possible design, the thickness of the glass layer is in a range of 1.1 mm-1.5 mm. The thickness of the glass layer in the range of 1.1 mm-1.5 mm can provide a good supporting effect while taking into account the production cost and the thickness of the decorative cover plate.

Exemplarily, the glass layer may be a transparent thin glass sheet having a thickness of 1.1 mm, a transparent thin glass sheet having a thickness of 1.2 mm, or a transparent thin glass sheet having a thickness of 1.5 mm.

In a possible design, the thickness of the substrate layer is in a range of 0.12 mm-0.15 mm. The thickness of the substrate layer in the range of 0.12 mm-0.15 mm can provide a good supporting effect while taking into account the production cost.

Exemplarily, the thickness of the substrate layer may be 0.12 mm, may be 0.13 mm, and may be 0.15 mm.

In a possible design, the display device includes a display screen and a backlight module with a local dimming function stacked with each other. The backlight module having the local dimming function can increase the contrast of the image displayed on the display screen to ensure that the image of the display screen can be presented through the decorative cover plate, and the boundary of the display screen is not visible to the user, so as to enhance the display effect of the smart surface.

In a second aspect, an embodiment of the present application further provides a center console of a vehicle including the smart surface provided by any of the preceding embodiments.

In a third aspect, an embodiment of the present application further provides a vehicle, the vehicle has an interior surface of a smart surface provided by any of the preceding embodiments.

BRIEF DESCRIPTION OF THE DRAWINGS

In order to more clearly illustrate the technical proposals in embodiments of the present application, accompanying drawings that are used in the description of the embodiments are briefly introduced hereinbelow. Obviously, the drawings in the following description are merely some embodiments of the present application. For those skilled in the art, other drawings can also be obtained according to these drawings without any creative effort.

Reference signs are as follows:

10 display device, 11 display screen, 12 backlight module, 13 sensing layer, 20 decorative cover plate, 21 decorative pattern layer, 22 substrate layer, 23 optical adhesive layer, 24 glass layer, 30 AG fluorescent film, 40 embossed-texture layer, and 50 transparent protective film.

DETAILED DESCRIPTION OF THE EMBODIMENTS

In order to make the purpose, technical proposals, and advantages of the present application more clearly understood, the present application will be described in further detail hereinbelow with reference to the accompanying drawings and embodiments. Apparently, the specific embodiments described herein are part of the embodiments of the present application, but not all of them. All other embodiments obtained by those of ordinary skill in the art, based on the embodiments of the present application, without creative efforts fall within the scope of protection of the present application.

In the description of the present application, "a plurality of" means at least two, such as two, three, etc., unless otherwise expressly and specifically defined. In the present application, unless otherwise clearly stated and defined, the terms "installed", "connection", "connected", "fixed" and the like should be interpreted in a broad sense. For example, it may be a fixed connection or a detachable connection, or it integrated into a unity; it may be directly connected, or it may be indirectly connected through an intermediate medium, it may be the internal connection of two elements or the interaction between two elements, unless otherwise clearly defined. For those of ordinary skill in the art, the specific meanings of the above terms in the present application can be understood according to specific circumstances.

In the present application, unless otherwise expressly stated and defined, a first feature being "on" or "below" a second feature may refer to that the first and second features are in direct contact, or the first and second features are in indirect contact through an intermediate medium. Furthermore, a first feature being "above", "on" and "over" a second feature may refer to that the first feature is directly above or diagonally above the second feature, or simply means that the first feature is higher in level than the second feature. A first feature being "below", "under" and "beneath" a second feature may refer to that the first feature is directly below or diagonally below the second feature, or simply means that the first feature is lower in level than the second feature.

Figure 1:
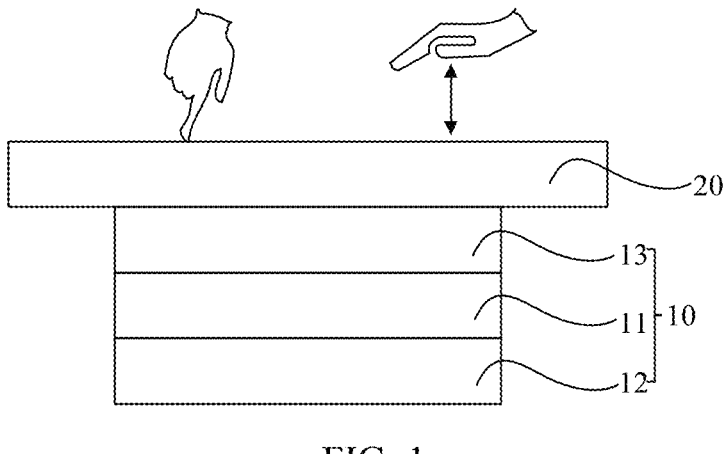
FIG. 1 is a schematic diagram of the structure of the smart surface according to an embodiment of the present application.

In the description of the present application, it should be understood that the orientation or positional relationship (if any) indicated by the terms "inner", "outer", "upper", "bottom", "front", "rear", etc. is based on the orientation or positional relationship shown FIG. 1 and is only for the convenience of describing the present application and simplifying the description. It does not indicate or imply that the device or element referred to must have a specific orientation, be constructed and operated in a specific orientation, and therefore cannot be understood as a limitation to the present application.

With the improvement of living standards, the number of car ownership continues to rise. While people enjoy the convenience brought by cars, more and more demands are now required not only for transportation, but also for the overall aesthetics, sense of technology and operating comfort of the interior of cars. Smart surface technology provides new functions for conventional decorative surfaces by integrating digital instrumentation, infotainment systems, virtual assistants, intelligent situational voice, gestures, haptics, wireless charging, and so on, so that any surface inside the car can be activated and controlled, equipping the car with more senses of technology.

A smart surface is a product structure with electronic functions added to its decorative surface, including a display device and a decorative cover plate covering the display screen of the display device. The display device is switched off when not needed, and the decorative cover plate displays a decorative pattern under external ambient light, functioning as a conventional decorative surface for static decoration. The display device can be activated through, for example, proximity, gestures, or voice control (that is, the display device is switched on), thus the image displayed on the display screen appears on the decorative pattern for human-computer interaction. However, when an image is presented on a decorative pattern, the decorative pattern may overlap the image, causing an unclear image and affecting the display effect of the smart surface.

In view of the above, embodiments of the present application provide a smart surface. By arranging an AG fluorescent film on the decorative cover plate, the objection of the image by the decorative pattern can be reduced to a certain extent, making the image displayed clearer and improving the display effect of the smart surface.

Figure 2:
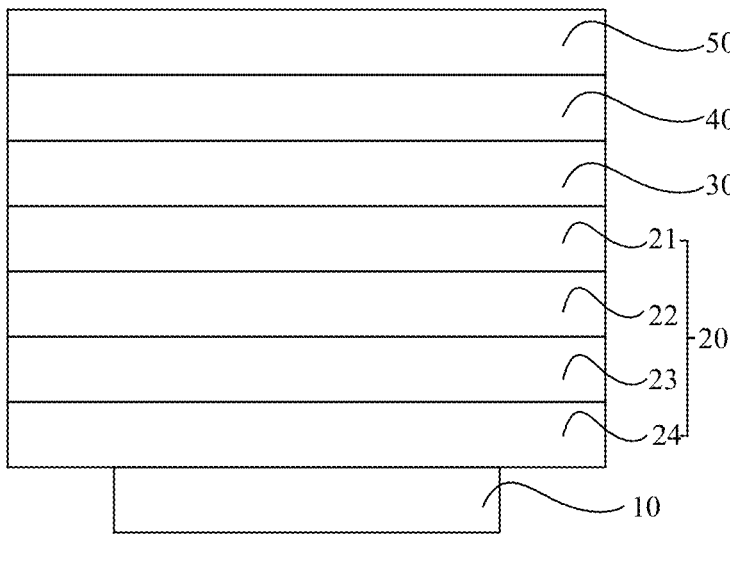
FIG. 2 is a schematic diagram of the specific structure of the smart surface according to an embodiment of the present application.

FIG. 1 is a schematic diagram of the structure of the smart surface provided by an embodiment of the present application. FIG. 2 is a schematic diagram of the specific structure of the smart surface provided by an embodiment of the present application. As shown in FIGS. 1 and 2, the smart surface provided by an embodiment of the present application includes a display device 10, a decorative cover plate 20, and an anti-glare (AG) fluorescent film 30.

The smart surface realizes human-computer interaction functions such as information display and intelligent control through the display device 10. The decorative cover plate 20 includes a decorative pattern layer 21, a substrate layer 22, an optical adhesive layer 23, and a glass layer 24 stacked in sequence from top to bottom, an upper surface of the glass layer 24 is fitted to the optical adhesive layer 23, a lower surface of the glass layer 24 is covered on a display surface of the display device 10, and the AG fluorescent film 30 is fitted to the decorative pattern layer 21, that is, an upper surface of the decorative pattern layer 21 is fitted to the AG fluorescent film 30, and a lower surface of the decorative pattern layer 21 is fitted to the substrate layer 22.

Specifically, the decorative pattern layer 21 may be a plastic film printed with a decorative pattern. For example, the plastic film may be a polyvinyl chloride (PVC) film, and the decorative pattern may be a wooden pattern, a leather pattern, a metal pattern, and the like, where the decorative pattern may be selected according to the specific application environment, so as to make the smart surface harmonize with the interior surfaces of the vehicle, ensuring the overall design effect of the interior space of the vehicle and enhancing the aesthetics of the vehicle.

The substrate layer 22 may be a transparent polyethylene terephthalate (PET) film, and the substrate layer 22, in addition to providing a supporting function, is also capable of protecting against ultraviolet light. The thickness of the substrate layer 22 is in a range of 0.12 mm to 0.15 mm, i.e., the thickness of the substrate layer 22 may be any value between 0.12 mm and 0.15 mm. For example, the thickness of the substrate layer 22 may be 0.12 mm, may be 0.13 mm, and may be 0.15 mm. By configuring the thickness of the substrate layer 22 between 0.12 mm and 0.15 mm, the substrate layer 22 can maintain a good supporting effect while taking into account the production cost.

The glass layer 24 may be a transparent thin sheet of glass, and the thickness of the glass layer 24 may range from 1.1 mm to 1.5 mm. That is, the thickness of the glass layer 24 may be any value between 1.1 mm and 1.5 mm. For example, the glass layer 24 may be a transparent thin sheet of glass having a thickness of 1.1 mm, a transparent thin sheet of glass having a thickness of 1.2 mm, or a transparent thin sheet of glass having a thickness of 1.5 mm. by configuring the thickness of the glass layer 24 between 1.1 mm and 1.5 mm, the glass layer 24 can maintain a good supporting role while taking into account its production cost and the overall thickness of the decorative cover plate 20.

The optical adhesive layer 23 may be an optical adhesive (a special adhesive for gluing optical elements), and the optical adhesive may be an optically clear adhesive (OCA) or an optically clear resin (OCR), or it may be a solid adhesive or a liquid adhesive, and the present application does not make any limitation thereto.

Exemplarily, in one embodiment, the optical adhesive is an OCA, which is characterized by high clarity, strong light transmission (total light transmission rate>99%), high adhesiveness, water- and high-temperature-resistance, UV resistance, good adhesive strength, and low curing shrinkage, etc. Utilization of the OCA optical adhesive can tightly bond the substrate layer 22 to the glass layer 24, so as to avoid the invasion of dust and moisture and maintain the cleanliness of the layers.

The AG fluorescent film 30 is configured for filtering external ambient light or light emitted from the decorative pattern layer 21. Light emitted from the decorative pattern layer 21 is filtered by the AG fluorescent film 30, so that the pattern in the decorative pattern presented in the image displayed by the display 11 can be reduced, so as to make the image displayed clearer. Most of the external ambient light passing through the AG fluorescent film 30 will be reflected, so that the external ambient light can be prevented from entering the display device 10, thereby preventing the user from seeing the display device 10 through the decorative cover plate 20, and enhancing the sense of realism when the smart surface is used as a decorative surface.

The smart surface provided by the embodiments of the present application, by providing the AG fluorescent film 30 on the decorative cover plate 20, is able to reduce the decorative pattern presented in the image to a certain extent, so that the image displayed by the display device 10 can be more clearly presented on the decorative cover plate 20, and the display effect of the smart surface can be improved.

Optionally, in one embodiment, the number of the decorative pattern layer 21 may be multiple, and the plurality of decorative pattern layers 21 are sequentially stacked while the decorative patterns in the plurality of decorative pattern layers 21 are the same. By providing the plurality of decorative pattern layers 21, the clarity of the decorative pattern can be increased, and the display effect when the smart surface is used as a conventional decorative surface can be improved. For example, the decorative cover plate 20 includes two decorative pattern layers 21 that are sequentially stacked.

Furthermore, in one embodiment, the smart surface also includes an embossed-texture layer 40 fitted on the AG fluorescent film layer 30, the embossed-texture layer 40 has an embossed pattern. The embossed-texture layer 40 with the embossed pattern can be formed on a flat plastic film (e.g., polyethylene film, polypropylene film, polyvinyl chloride film, polyester film, etc.) by a pattern roller.

Exemplarily, in this embodiment, the decorative pattern is a wooden pattern, and the embossed pattern imitates the wood grain. The wooden pattern and the embossed wood grain on the AG fluorescent film 30 allow the smart surface not only to visually have a three-dimensional, layered and varying textured effect as that of natural wood, but also demonstrate the tactility of the embossed wood grain, so as to increase the realistic feel of the smart surface.

In order to protect the embossed-texture layer 40, the smart surface further includes a transparent protective film 50, and the transparent protective film 50 has a hardness greater than 3 H.

As shown in FIGS. 1 and 2, in this embodiment of the present application, the display device 10 includes a sensing layer 13, a display screen 11, and a backlight module 12 stacked in sequence from top to bottom.

The sensing layer 13 includes at least one of a touch sensor (e.g., a capacitive inductive touch switch, a resistive inductive touch switch, etc.) and a proximity sensor (e.g., a photoelectric proximity sensor, a capacitive proximity sensor, an inductive proximity sensor, etc.), and is configured for determining whether there is an external object (e.g., a user's finger, etc.) that is touching or in proximity to the decorative cover plate 20. Exemplary, when an external object is in proximity or touching the decorative cover plate 20, the display screen 11 and the backlight module 12 are in an operation state, at which point the decorative cover plate 20 presents the image displayed by the display screen 11 as the backlight module 12 operates, realizing human-computer interaction function. When there is no external object in proximity or touching the decorative cover plate 20, the display screen 11 and the backlight module 12 are in an off state, at which point the decorative cover plate 20 presents a decorative pattern (for example, a wooden pattern, etc.) under the external ambient light.

The display screen 11 may be a light-emitting diode (LED) screen or a liquid crystal display (LCD) screen. The present application does not limit the specific shape of the display screen 11, for example, the display screen 11 may be a planar display or a curved display. When the display screen 11 is a planar display, the smart surface is correspondingly planar; when the display screen 11 is a curved display, the smart surface is correspondingly curved. The size of the display screen 11 is smaller than the size of the decorative cover plate 20, ensuring that the decorative cover plate 20 can present the complete image displayed by the display screen 11.

The backlight module 12 has a local dimming function, and the backlight group (e.g., LED light group) in the backlight module 12 may be divided into a plurality of backlight partitions. The contrast of the image displayed on the display screen 11 can be increased by controlling the brightness of each backlight partition through local dimming technology, so as to ensure that the image on the display screen 11 can be presented through the decorative cover plate 20, and avoid the boundary of the display screen 11 being visible to the user, which improves the display effect of the smart surface.

Exemplarily, the LED light group may be divided into 81 backlight partitions according to the shape of the LED light arrangement and the size of the backlight module 12, and of course, it may be divided into other numbers of backlight partitions, such as 49 backlight partitions, 64 backlight partitions, and the like.

Herein, the irregular distribution of the decorative pattern may result in differences in the light transmittance at various positions over the decorative cover plate 20, and by controlling the brightness of the various backlighting partitions through local dimming technology, the light transmittance at various positions on the decorative cover plate 20 can be kept consistent, the light-emitting uniformity can be improved, and thus the display effect of the smart surface can be enhanced. Specifically, the light transmittance is used to indicate the ability of light to pass through a medium, and may be a percentage of the luminous flux through a transparent or translucent body to the incident luminous flux.

It is to be noted that the smart surface provided by the embodiments of the present application may be an interior surface of a transportation vehicle, such as an interior surface of a car, an interior surface of an airplane, an interior surface of a ship, etc. The smart surface may also be a decorative surface of the interior or exterior of a building, such as a decorative surface of a wall in a shopping mall, etc. The smart surface may also be a decorative surface of a household appliance, such as a decorative surface of a refrigerator, a decorative surface of a washing machine, etc.

Figure 3:
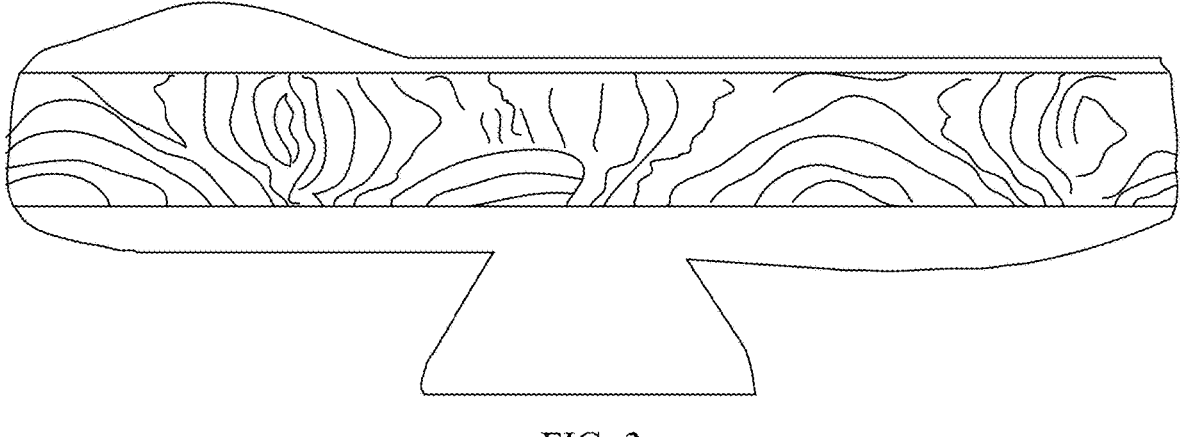
FIG. 3 is a schematic diagram of a scenario of the smart surface when the display device is not in an operation state according to an embodiment of the present application.
Figure 4:
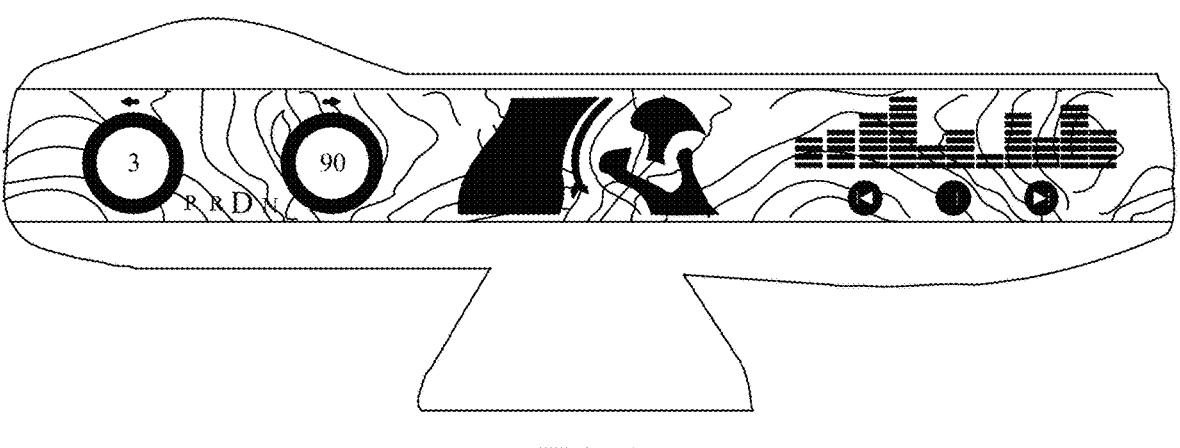
FIG. 4 is a schematic diagram of a scenario of the smart surface when the display device is in an operation state according to an embodiment of the present application.

FIG. 3 is a schematic diagram of a scenario of the smart surface when the display device is not in the operation state according to an embodiment of the present application. FIG. 4 is a schematic diagram of a scenario of the smart surface when the display device is in the operation state according to an embodiment of the present application. The working process of the smart surface provided by an embodiment of the present application is described below with reference to FIGS. 1, 3, and 4.

Exemplarily, when the display device 10 is not in the operation state (namely when there is no finger touching or in proximity to the decorative cover plate 20), the decorative cover plate 20 displays a decorative pattern (e.g., a wooden pattern as shown in FIG. 3) under the external ambient light. At this point, the smart surface is a decorative surface (e.g., an interior surface of a vehicle center console, an interior surface of a vehicle door, etc.). When the display device 10 is in the operation state (when a finger is touching or in proximity to the decorative cover plate 20, as shown in FIG. 1), the decorative cover plate 20 presents an image displayed by the display screen 11 under the action of the backlight module 12. For example, as shown in FIG. 4, a tachometer, a speedometer, a navigation map, a turn indicator, a music player interface, and the like may be displayed on the wooden pattern. At this point, the smart surface can realize the human-computer interaction functions, allowing the user to complete a corresponding operation.

An embodiment of the present application also provides a center console of a vehicle that includes the smart surface provided in any of the aforementioned embodiments.

Since the decorative surface of the center console is a smart surface provided by any of the aforementioned embodiments, the center console of the vehicle also has the technical effect corresponding to the above-mentioned smart surface, which will not be repeated herein.

An embodiment of the present application also provides a vehicle having a decorative surface that is a smart surface provided by any of the aforementioned embodiments. For example, the interior surface of the vehicle door is a smart surface provided by an embodiment of the present application, and the interior surface of the vehicle seat is a smart surface provided by an embodiment of the present application.

Since the decorative surface at any position of the vehicle may be a smart surface provided by any of the aforementioned embodiments, the vehicle also has the technical effect corresponding to the aforementioned smart surface, which will not be repeated herein.

The above are merely specific embodiments of the present application, and are not intended to limit the present application. Any changes or substitutions made by those skilled in the art within the technical scope disclosed in the present application shall fall within the scope of protection of the present application. Therefore, the scope of protection of the present application shall be subject to the scope of protection of appended claims.

What is claimed is:

1. A smart surface, comprising:
   a display device (10),
   a decorative cover plate (20) comprising a decorative pattern layer (21), a substrate layer (22), an optical adhesive layer (23), and a glass layer (24) stacked sequentially from top to bottom, an upper surface of the glass layer (24) being fitted to the optical adhesive layer (23), and a lower surface of the glass layer (24) being covered on the display device (10), and
   an anti-glare fluorescent film layer (30) fitted to the decorative pattern layer (21), and the anti-glare fluorescent film layer (30) being used for filtering ambient light or light emitted from the decorative pattern layer (21).

2. The smart surface according to claim 1, wherein the smart surface further comprises an embossed-texture layer (40) fitted to the anti-glare fluorescent film layer (30), and the embossed-texture layer (40) has an embossed pattern.

3. The smart surface according to claim 2, wherein a transparent protective film (50) is adhered to the embossed-texture layer (40), and the transparent protective film (50) has a hardness greater than 3 H.

4. The smart surface according to claim 1, wherein a decorative pattern on the decorative pattern layer (21) is a wooden pattern.

5. The smart surface according to claim 2, wherein when a decorative pattern on the decorative pattern layer (21) is a wooden pattern, the embossed pattern imitates wood grain.

6. The smart surface according to claim 1, wherein a thickness of the glass layer (24) is in a range of 1.1 mm to 1.5 mm.

7. The smart surface according to claim 1, wherein a thickness of the substrate layer (22) is in a range of 0.12 mm to 0.15 mm.

8. The smart surface according to claim 1, wherein the display device (10) comprises a display screen (11) and a backlight module (12) with a local dimming function stacked with each other.

9. A center console of a vehicle comprising a smart surface, wherein the smart surface comprises:

a display device (10), a decorative cover plate (20) comprising a decorative pattern layer (21), a substrate layer (22), an optical adhesive layer (23), and a glass layer (24) stacked sequentially from top to bottom, an upper surface of the glass layer (24) being fitted to the optical adhesive layer (23), and a lower surface of the glass layer (24) being covered on the display device (10), and an anti-glare fluorescent film layer (30) fitted to the decorative pattern layer (21), and the anti-glare fluorescent film layer (30) being used for filtering ambient light or light emitted from the decorative pattern layer (21).

10. The center console of a vehicle according to claim 9, wherein the smart surface further comprises an embossed-texture layer (40) fitted to the anti-glare fluorescent film layer (30), and the embossed-texture layer (40) has an embossed pattern.

11. The center console of a vehicle according to claim 10, wherein a transparent protective film (50) is adhered to the embossed-texture layer (40), and the transparent protective film (50) has a hardness greater than 3 H.

12. The center console of a vehicle according to claim 9, wherein a decorative pattern on the decorative pattern layer (21) is a wooden pattern.

13. The center console of a vehicle according to claim 10, wherein when a decorative pattern on the decorative pattern layer (21) is a wooden pattern, the embossed pattern imitates wood grain.

14. The center console of a vehicle according to claim 9, wherein a thickness of the glass layer (24) is in a range of 1.1 mm to 1.5 mm.

15. The center console of a vehicle according to claim 9, wherein a thickness of the substrate layer (22) is in a range of 0.12 mm to 0.15 mm.

16. The center console of a vehicle according to claim 9, wherein the display device (10) comprises a display screen (11) and a backlight module (12) with a local dimming function stacked with each other.

17. A vehicle, wherein an interior surface of the vehicle is the smart surface according to claim 1.

* * * * *